(12) United States Patent
Spokane et al.

(10) Patent No.: US 7,134,732 B1
(45) Date of Patent: Nov. 14, 2006

(54) COMPOSITE VEHICLE WHEEL HUB AND METHOD FOR PRODUCING SAME

(75) Inventors: Hannah Spokane, Bellbrook, OH (US); Bryan Russell, Brighton, MI (US); Joseph Willey, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 126 days.

(21) Appl. No.: 10/840,078

(22) Filed: May 6, 2004

(51) Int. Cl.
*B60B 27/00* (2006.01)
*B23P 17/00* (2006.01)

(52) U.S. Cl. ............... 301/106; 301/105.1; 29/894.361

(58) Field of Classification Search ............. 301/105.1, 301/106–107, 35.627; 29/894.011, 894.36, 29/894.361
See application file for complete search history.

(56) References Cited

U.S. PATENT DOCUMENTS

| | | | | |
|---|---|---|---|---|
| 474,754 | A * | 5/1892 | Monteith | 301/106 |
| 660,873 | A * | 10/1900 | Trump et al. | 301/106 |
| 850,328 | A * | 4/1907 | Unckrich | 301/106 |
| 860,247 | A * | 7/1907 | Reid | 301/106 |
| 3,724,907 | A * | 4/1973 | Housel | 301/105.1 |
| 4,699,431 | A * | 10/1987 | Daberkoe | 301/1 |
| 5,263,900 | A * | 11/1993 | Stimson | 188/181 R |
| 5,692,811 | A * | 12/1997 | Rogers | 301/105.1 |
| 5,947,613 | A | 9/1999 | Cormier | |
| 6,039,407 | A | 3/2000 | Wiacek et al. | |
| 6,089,673 | A | 7/2000 | Wiacek et al. | |
| 6,227,624 | B1 | 5/2001 | Wiacek et al. | |
| 6,364,426 | B1 | 4/2002 | Horne et al. | |
| 6,523,909 | B1 * | 2/2003 | Nakamura et al. | 301/105.1 |
| 6,739,674 | B1 * | 5/2004 | Vignotto et al. | 301/35.627 |
| 2003/0062764 | A1 * | 4/2003 | Vignotto et al. | 301/105.1 |

* cited by examiner

*Primary Examiner*—Jason R. Bellinger
(74) *Attorney, Agent, or Firm*—MacMillan, Sobanski & Todd, LLC

(57) ABSTRACT

A composite vehicle wheel hub includes an inner wheel hub portion formed from a first material and an outer wheel hub portion formed from a second material and joined to the inner wheel hub portion. A method for producing the composite vehicle wheel hub of this invention includes the steps of: (a) providing one of an inner wheel hub portion and an outer wheel hub portion formed from a first material; (b) placing the one of the inner wheel hub portion and the outer wheel hub portion in a mold; (c) casting the other one of the inner wheel hub portion and the outer wheel hub portion formed from a second material in situ within the mold to thereby produce the composite vehicle wheel hub; and (d) removing the composite vehicle wheel hub from the mold.

22 Claims, 7 Drawing Sheets

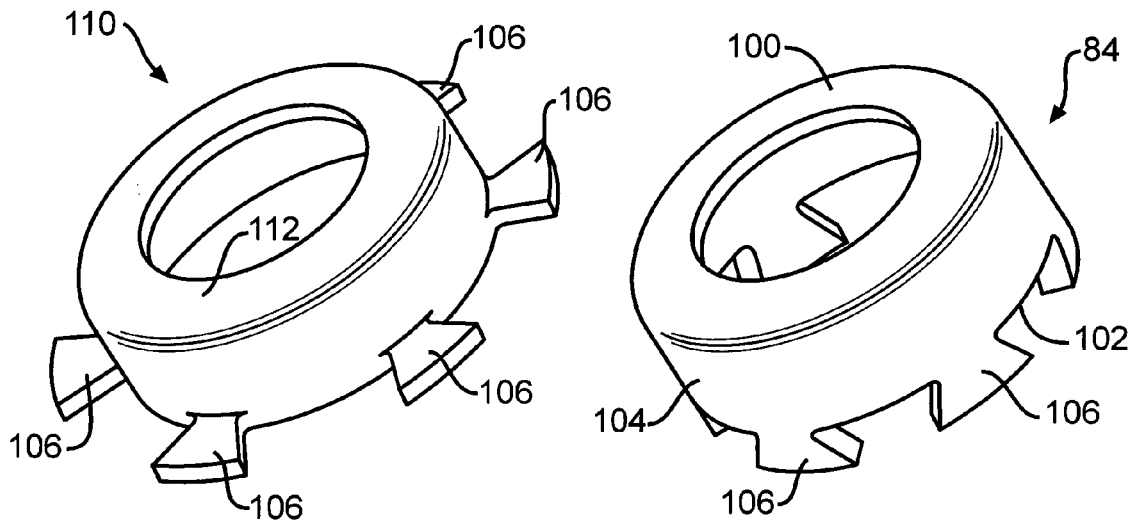
FIG. 4A
FIG. 4B
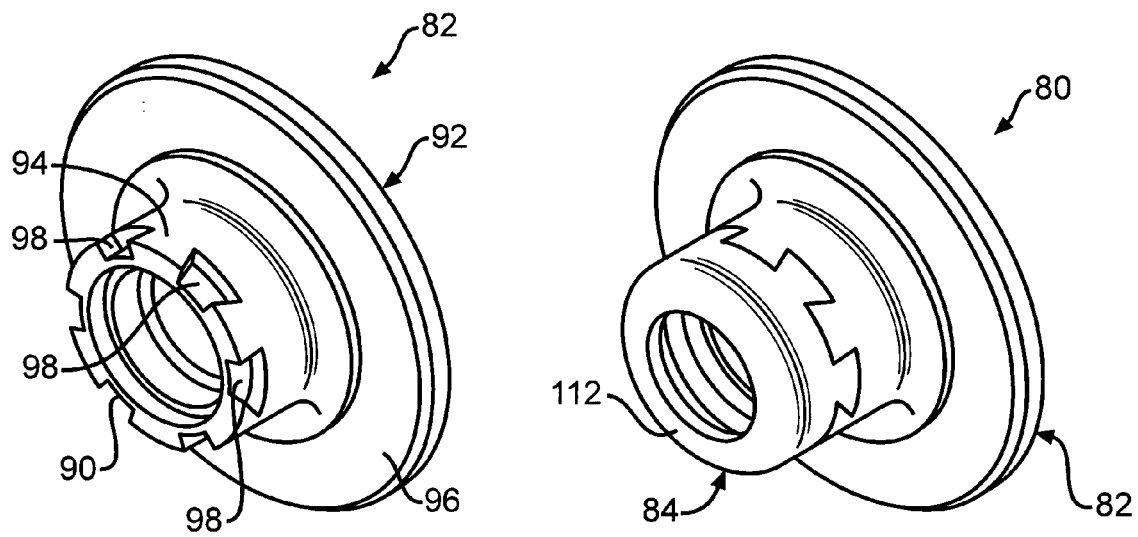
FIG. 4C
FIG. 4D

COMPOSITE VEHICLE WHEEL HUB AND METHOD FOR PRODUCING SAME

BACKGROUND OF THE INVENTION

This invention relates in general to a vehicle wheel end assembly and in particular to an improved structure for a wheel hub for use in such a vehicle wheel end assembly and method for producing such a composite vehicle wheel hub.

A typical vehicle wheel end assembly for a front wheel of a vehicle includes a wheel hub, a steering knuckle, and a bearing assembly. The wheel hub is supported by the bearing assembly and the bearing assembly is secured to a non-rotatable component of the vehicle, which in this case is the steering knuckle, so as to rotatably support the wheel hub relative thereto. In the case of a driven wheel application, the wheel hub can include an internal bore provided with internal splines for receiving mating external splines provided on an axle for rotatably connecting the wheel hub to the axle for rotation therewith. In the case of a non-driven wheel application, the wheel hub does not include the internal splines.

The wheel hub also includes a generally radially outwardly extending flange. The flange includes a plurality of circumferentially spaced stud receiving holes formed therein. The stud receiving holes are adapted to receive studs and nuts for securing a rotatable brake component, such as for example a brake rotor and a vehicle wheel to the wheel hub for rotation therewith.

To secure the bearing assembly and the wheel hub together for rotation with one another and also to preload the bearing assembly, a spanner nut is installed on a threaded inner end of the wheel hub and tightened to a predetermined torque in order to exert a predetermined clamp load on the bearing assembly. U.S. Pat. No. 6,089,673 to Wiacek et al. shows such a design in prior art FIGS. 1–3. Alternatively, a threaded retention nut or non-threaded retention ring can be installed on a respective threaded or non-threaded inner end of the wheel hub and the inner end of the wheel hub can be deformed outwardly to secure the bearing assembly and wheel hub together and to preload the bearing. U.S. Pat. No. 6,089,673 to Wiacek et al. shows such designs in FIGS. 4–7 and 9–12.

SUMMARY OF THE INVENTION

This invention relates to an improved structure for a composite vehicle wheel hub. The composite vehicle wheel hub includes an inner wheel hub portion formed from a first material and an outer wheel hub portion formed from a second material and joined to the inner wheel hub portion. A method for producing the composite vehicle wheel hub of this invention includes the steps of: (a) providing one of an inner wheel hub portion and an outer wheel hub portion formed from a first material; (b) placing the one of the inner wheel hub portion and the outer wheel hub portion in a mold; (c) casting the other one of the inner wheel hub portion and the outer wheel hub portion formed from a second material in situ within the mold to thereby produce the composite vehicle wheel hub; and (d) removing the composite vehicle wheel hub from the mold.

Other advantages of this invention will become apparent to those skilled in the art from the following detailed description of the preferred embodiments, when read in light of the accompanying drawings.

BRIEF DESCRIPTION OF THE DRAWINGS

FIG. 4A is view of one of two components which can be used to produce a fourth embodiment of a composite wheel hub in accordance with this invention, the component shown in this view being in an initially manufactured state.

FIG. 4B is another view of the component shown in FIG. 4A, the component shown in this view being in a fully manufactured state.

FIG. 4C is a view of the second component of the fourth embodiment of a composite wheel hub in accordance with this invention.

FIG. 4D is a perspective view of the fourth embodiment of the composite vehicle wheel hub, including the components illustrated in FIGS. 4B and 4C, in accordance with this invention.

DETAILED DESCRIPTION OF THE PREFERRED EMBODIMENTS

Figure 1A:
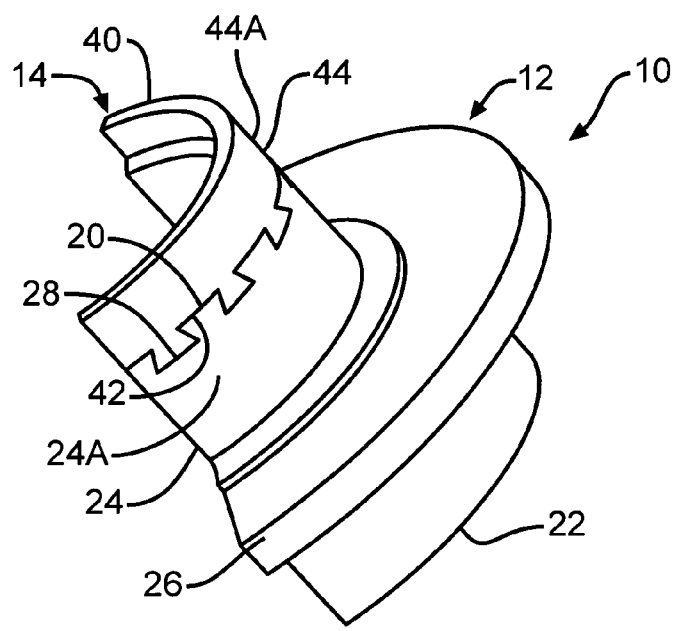
FIG. 1A is a perspective view, partially broken away, of a portion of a first embodiment of a composite vehicle wheel hub in accordance with this invention.

Referring now to FIG. 1A, there is illustrated a first embodiment of a composite vehicle wheel hub, indicated generally at 10, in accordance with this invention. The illustrated composite vehicle wheel hub is associated with a 4×4 driven front wheel (not shown) of a vehicle. The illustrated composite vehicle wheel hub 10 is designed to work with any suitable type of bearing unit, such as a conventional pregreased, sealed-for life non-serviceable cartridge style bearing pack assembly shown at 254 in FIG. 8.

As is known, this type of bearing assembly 254 includes an outer double bearing race which is stationary and forms a flange 260 suitable for mounting to a knuckle or other non-rotatable component (not shown). The bearing assembly further includes inner races which form a bore through which the wheel hub main body passes through and rotates therein. The outer race, inner races and bearing internal components are packaged together as a single unit and is commonly referred to as the bearing assembly. Although this invention will be described and illustrated in conjunction with the particular composite vehicle wheel hubs disclosed herein, it will be appreciated that this invention may be used in conjunction with other vehicle wheel hub structures. For example, the composite vehicle wheel hub of this invention can be used in a front or rear non-driven or driven wheel applications and/or in conjunction with other types of bearing units. For example, this invention can be used in conjunction with the vehicle wheel hubs and/or bearing units shown in U.S. Pat. No. 6,089,673 to Wiacek et. al., U.S. Pat. No. 6,227,624 to Wiacek et al., U.S. Pat. No. 6,364,426 to Horne et al., U.S. Pat. No. 6,039,407 to Wiacek et al., and U.S. Pat. No. 5,947,613 to Cormier, the disclosures of each of these patents incorporated by reference herein.

Figure 1B:
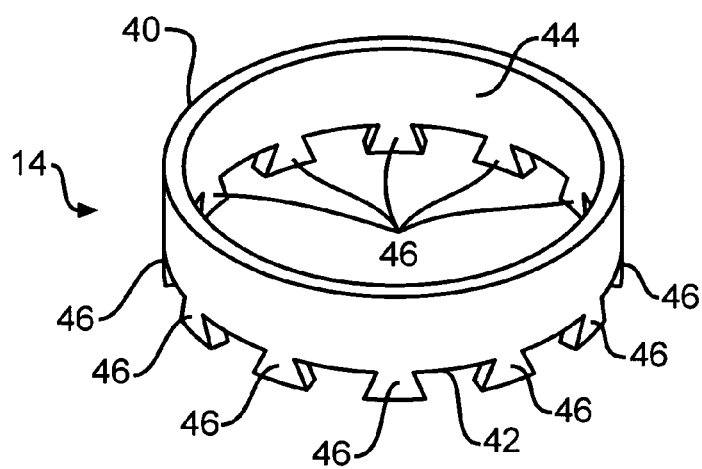
FIG. 1B is a view of one of the two components shown in the first embodiment of the vehicle wheel hub illustrated in FIG. 1A.
Figure 1C:
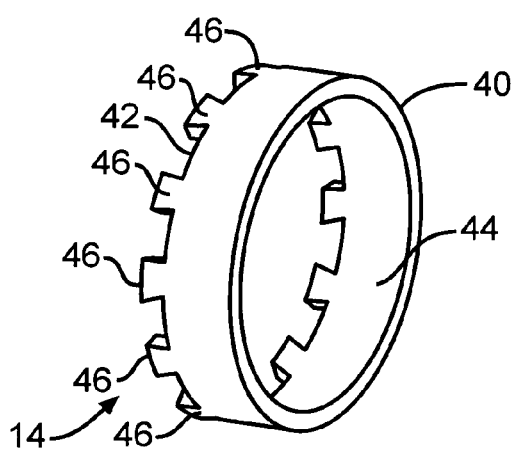
FIG. 1C is another view of the component shown in FIG. 1B.

The illustrated composite vehicle wheel hub 10 includes a first or outer wheel hub portion 12 and a second or inner wheel hub portion 14, best shown in FIGS. 1B and 1C, which are formed and joined together in a manner to be discussed below in accordance with the present invention. The outer wheel hub portion 12 is preferably formed a castable material and includes a generally stepped body having an opened inboard end 20, an opened outboard end 22, and a generally axially extending main body 24. The main body 24 of the outer wheel hub portion 12 is provided with a radially outwardly extending flange 26 and defines a bearing seat for receiving a bearing assembly (not shown). Preferably, the outer wheel hub portion 12 is formed from cast iron. More preferably, the outer wheel hub portion 12 is formed from gray or ductile iron. Alternatively, other suitable castable materials, such as for example, other types of cast iron can be used if so desired. Also, the outer wheel hub portion 12 can be formed from a suitable non-cast material, such as for example, from steel, titanium and magnesium, by a suitable process, such as for example, stamping, cutting, forging and blanking, if so desired.

In the illustrated embodiment, the inboard end 20 is provided with a plurality of recesses or cutouts 28. In this embodiment, the recesses 28 are equally spaced circumferentially around the inboard end 20 and have a generally trapezoidal shape. Alternatively, the outer wheel hub portion 12 can be formed from other suitable materials and/or the shape, number and/or spacing of the recesses 28 can be other than illustrated if so desired. Also, in this embodiment, the bearing assembly is supported mainly only by an outer surface 24A of the main body 24 of the outer wheel hub portion 12 adjacent the opened inboard end 20. Alternatively, the bearing assembly can be supported by other methods if so desired. For example, the bearing assembly could be supported by at least a portion of an outer surface 24A and 44A of both the outer wheel hub portion 12 and the inner wheel hub portion 14 or only by the outer surface 44A of the inner wheel hub portion 14 if so desired.

The inner wheel hub portion 14 is a hoop or annular band like member and is preferably formed from a non-cast material, such as steel. The inner wheel hub portion 14 includes an opened inboard end 40, and opened outboard end 42, and a generally axially extending main body 44.

In the illustrated embodiment, the outboard end 42 of the outer wheel hub portion 14 is provided with a plurality of lugs or extensions 46. In this embodiment, the lugs 46 are equally spaced circumferentially around the outboard end 42 and have a generally trapezoidal shape. Alternatively, the inner wheel hub portion 14 can be formed from other suitable non-cast materials, such as for example, titanium and magnesium and/or the shape, number and/or spacing of the lugs 46 can be other than illustrated if so desired. Also, the inner wheel hub portion 14 can be formed from a suitable cast material, such as cast iron, if so desired. As will be discussed below, the lugs 46 are operative to join the outer wheel hub portion 12 and the inner wheel hub portion 14 together during the manufacture of the composite vehicle wheel hub 10. Also, other means can be used to join the outer wheel hub portion 12 and the inner wheel hub portion 14 together. For example, the outer wheel hub portion 12 can include the lugs and the inner wheel hub portion 14 can include the recesses. In both instances, it can be seen that the recesses 20 and the lugs 46 of the finished vehicle wheel hub 10 are operative to produce a generally dovetail-like joint to secure or join the inner wheel hub portion 12 and the outer wheel hub portion 14 together.

Figure 2:
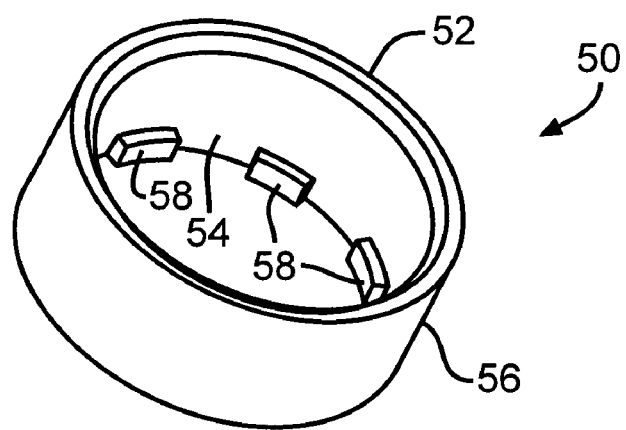
FIG. 2 is a view of one of two components which can be used to produce a second embodiment of a composite wheel hub in accordance with this invention.

Referring now to FIG. 2, there is illustrated a second embodiment of a second or inner wheel hub portion, indicated generally at 50, which can be used to produce a composite vehicle wheel hub in accordance with the present invention. The inner wheel hub portion 50 is a hoop or annular band like member and is preferably formed from steel. The inner wheel hub portion 50 includes an opened inboard end 52, and opened outboard end 54, and a generally axially extending main body 56.

In the illustrated embodiment, the outboard end 54 of the inner wheel hub portion 50 is provided with a plurality of lugs or extensions 58. In this embodiment, the lugs 58 are equally spaced circumferentially around the outboard end 54 and have a generally rectangular shape. Alternatively, the inner wheel hub portion 50 can be formed from other suitable materials, such as for example, titanium and magnesium and/or the shape, number and/or spacing of the lugs 58 can be other than illustrated if so desired. Also, the inner wheel hub portion 50 can be formed from a suitable cast material, such as cast iron, if so desired.

Figure 3:
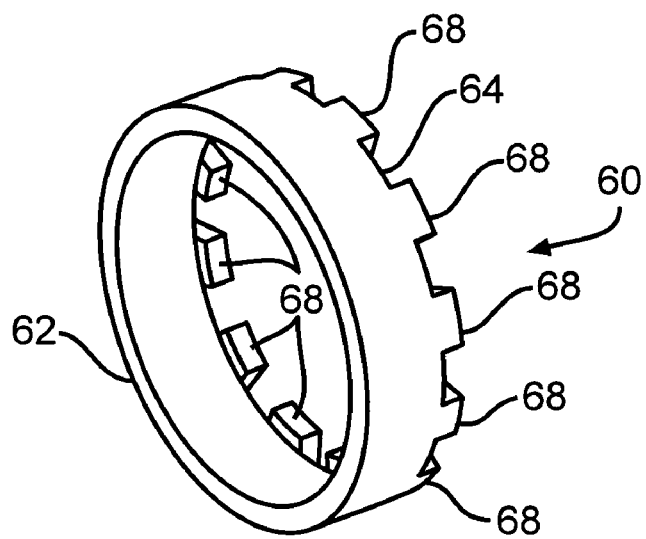
FIG. 3 is a view of one of two components which can be used to produce a third embodiment of a composite wheel hub in accordance with this invention.

Referring now to FIG. 3, there is illustrated a third embodiment of a second or inner wheel hub portion, indicated generally at 60, which can be used to produce a composite vehicle wheel hub in accordance with the present invention. The inner wheel hub portion 60 is a hoop or annular band like member and is preferably formed from steel. The inner wheel hub portion 60 includes an opened inboard end 62, and opened outboard end 64, and a generally axially extending main body 66.

In the illustrated embodiment, the outboard end 64 of the inner wheel hub portion 60 is provided with a plurality of lugs or extensions 68. In this embodiment, the lugs 68 are equally spaced circumferentially around the outboard end 64 and have a generally rectangular shape. Alternatively, the inner wheel hub portion 60 can be formed from other suitable materials, such as for example, titanium and magnesium and/or the shape, number and/or spacing of the lugs 68 can be other than illustrated if so desired. Also, the inner wheel hub portion 60 can be formed from a suitable cast material, such as cast iron, if so desired.

Referring now to FIG. 4C, there is illustrated a fourth embodiment of a composite vehicle wheel hub, indicated generally at 80, in accordance with this invention. The composite vehicle wheel hub 80 is adapted for use in a 4×2 non-driven front wheel (not shown) of a vehicle and includes a first or outer wheel hub portion 82, best shown in FIG. 4D, and a second or inner wheel hub portion 84, best shown in FIG. 4B, which are joined together in a manner to be discussed below in accordance with the present invention.

The outer wheel hub portion 82 is preferably formed a castable material and includes a generally stepped body having an opened inboard end 90, an opened outboard end 92, and a generally axially extending main body 94. The main body 94 of the outer wheel hub portion 82 is provided with a radially outwardly extending flange 96 and defines a bearing seat for receiving a bearing assembly (not shown). Preferably, the outer wheel hub portion 82 is formed from cast iron. More preferably, the outer wheel hub portion 82 is formed from gray or ductile iron. Alternatively, other suitable castable materials, such as for example, other types of cast iron can be used if so desired. Also, the outer wheel hub portion 82 can be formed from a suitable non-cast material, such as for example, from steel, titanium and magnesium, by a suitable process, such as for example, stamping, cutting, forging and blanking, if so desired.

In the illustrated embodiment, the inboard end 90 is provided with a plurality of recesses or cutouts 98. In this embodiment, the recesses 98 are equally spaced circumferentially around the inboard end 90 and have a generally trapezoidal shape. Alternatively, the outer wheel hub portion 82 can be formed from other suitable materials and/or the shape, number and/or spacing of the recesses 98 can be other than illustrated if so desired.

The inner wheel hub portion 84 is a cup-like shaped member and is preferably formed from steel. As shown in FIG. 4B, the inner wheel hub portion 84 includes an opened inboard end 100, and opened outboard end 102, and a generally axially extending main body 104.

In the illustrated embodiment, the outboard end 102 of the outer wheel hub portion 84 is provided with a plurality of lugs or extensions 106. In this embodiment, the lugs 106 are equally spaced circumferentially around the outboard end 102 and have a generally trapezoidal. Alternatively, the inner wheel hub portion 84 can be formed from other suitable materials, such as for example, titanium and magnesium and/or the shape, number and/or spacing of the lugs 106 can be other than illustrated if so desired. Also, the inner wheel hub portion 84 can be formed from a suitable cast material, such as cast iron, if so desired. As will be discussed below, the lugs 106 are operative to join the outer wheel hub portion 82 and the inner wheel hub portion 84 together during the manufacture of the composite vehicle wheel hub 80. Also, other means can be used to join the outer wheel hub portion 82 and the inner wheel hub portion 84 together. For example, the outer wheel hub portion 82 can include the lugs and the inner wheel hub portion 84 can include the recesses. In both instances, it can be seen that recesses 98 and the lugs 106 of the finished vehicle wheel hub 80 are operative to produce a generally dovetail like joint to secure or join the inner wheel hub portion 84 and the outer wheel hub portion 82 together.

In this embodiment, the inner wheel hub portion 84 is preferably formed from a generally flat blank (not shown) by a stamping process to produce an initial drawn stamped plate 110, shown in FIG. 4A. As shown in FIG. 4A, the initially formed plate 110 has a cup-like shape and includes the lugs 106 and a center flange or cup 112. Following this, the lugs 106 are bent or folded over to extend generally parallel relative to the main body 104, or generally perpendicular to the center flange 112, to produce the inner wheel hub portion 84 shown in FIGS. 4B and 4C. As will be discussed below, the center flange 112 is used for positioning purposes in the mold during the casting of the outer wheel hub portion 82 about the inner wheel hub portion 84 and is later removed by a suitable process.

Figure 5A:
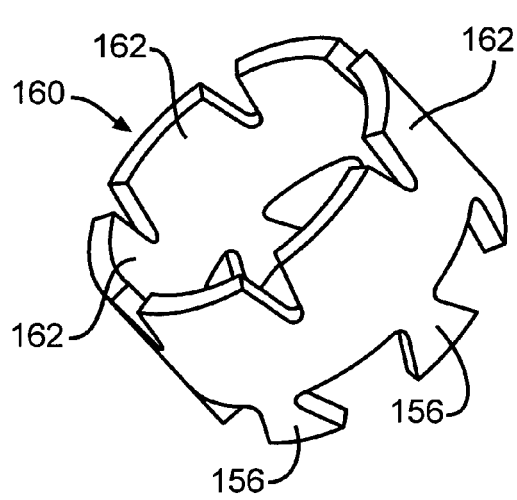
FIG. 5A is view of one of two components which can be used to produce a fifth embodiment of a composite wheel hub in accordance with this invention, the component shown in this view being in an initially manufactured state.
Figure 5B:
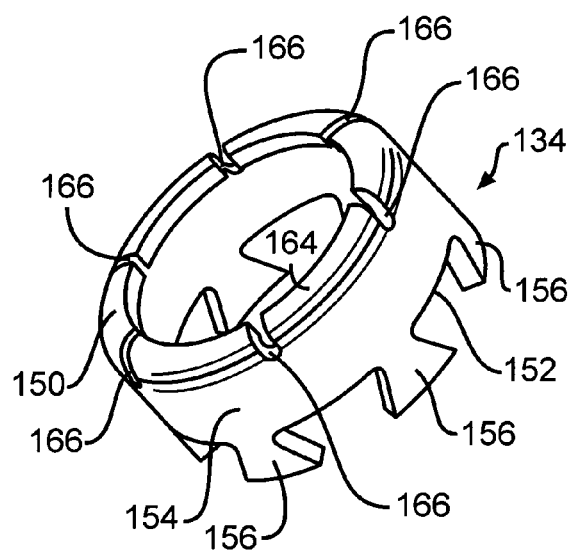
FIG. 5B is another view of the component shown in FIG. 5A, the component shown in this view being in a fully manufactured state.
Figure 5C:
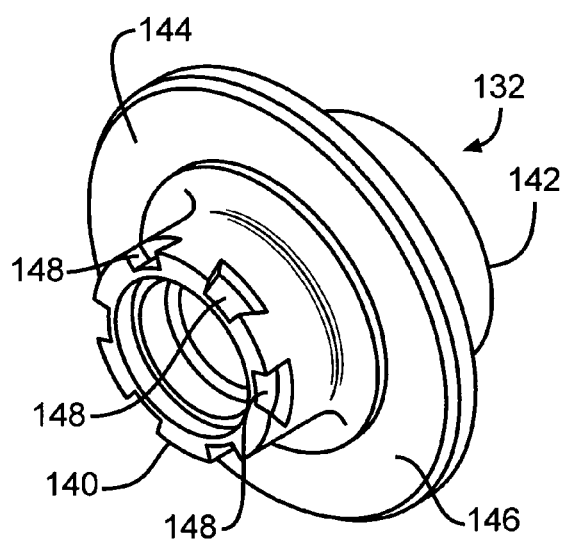
FIG. 5C is a view of the second component of the fifth embodiment of a composite wheel hub in accordance with this invention.
Figure 5D:
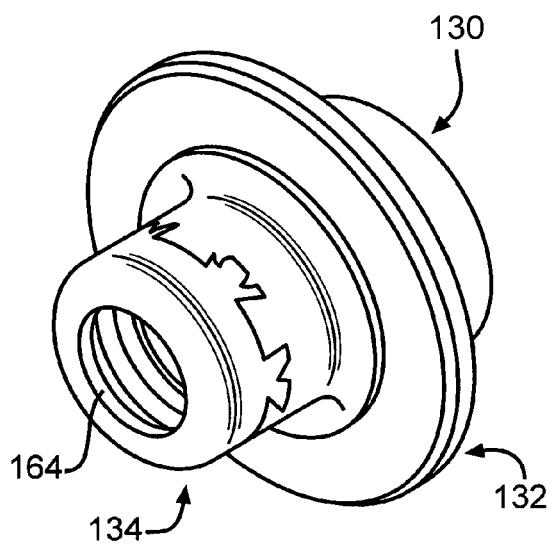
FIG. 5D is a perspective view of the fifth embodiment of the composite vehicle wheel hub, including the component illustrated in FIGS. 5B and 5C, in accordance with this invention.

Referring now to FIG. 5C, there is illustrated a fifth embodiment of a composite vehicle wheel hub, indicated generally at 130, in accordance with this invention. The composite vehicle wheel hub 130 is adapted for use in a 4×4 non-driven front wheel (not shown) of a vehicle and includes a first or outer wheel hub portion 132, best shown in FIG. 5D, and a second or inner wheel hub portion 134, best shown in FIG. 5B, which are joined together in a manner to be discussed below in accordance with the present invention.

The outer wheel hub portion 132 is preferably formed from a castable material and includes a generally stepped body having an opened inboard end 140, an opened outboard end 142, and a generally axially extending main body 144. The main body 144 of the outer wheel hub portion 132 is provided with a radially outwardly extending flange 146 and defines a bearing seat for receiving a bearing assembly (not shown). Preferably, the outer wheel hub portion 132 is formed from cast iron. More preferably, the outer wheel hub portion 132 is formed from gray or ductile iron. Alternatively, other suitable castable materials, such as for example, other types of cast iron can be used if so desired. Also, the outer wheel hub portion 132 can be formed from a suitable non-cast material, such as for example, from steel, titanium and magnesium, by a suitable process, such as for example, stamping, cutting, forging and blanking, if so desired.

In the illustrated embodiment, the inboard end 140 is provided with a plurality of recesses or cutouts 148. In this embodiment, the recesses 148 are equally spaced circumferentially around the inboard end 140 and have a generally trapezoidal shape. Alternatively, the outer wheel hub portion 132 can be formed from other suitable materials and/or the shape, number and/or spacing of the recesses 148 can be other than illustrated if so desired.

The inner wheel hub portion 134 is a tube-like shaped member and is preferably formed from steel. As shown in FIG. 5B, the inner wheel hub portion 134 includes an opened inboard end 150, and opened outboard end 152, and a generally axially extending main body 154. In the illustrated embodiment, the outboard end 152 of the outer wheel hub portion 134 is provided with a plurality of lugs or extensions 156. In this embodiment, the lugs 156 are equally spaced circumferentially around the outboard end 152 and have a generally trapezoidal shape. Alternatively, the inner wheel hub portion 134 can be formed from other suitable materials, such as for example, titanium and magnesium and/or the shape, number and/or spacing of the lugs 156 can be other than illustrated if so desired. Also, the inner wheel hub portion 134 can be formed from a suitable cast material, such as cast iron, if so desired. As will be discussed below, the lugs 156 are operative to join the outer wheel hub portion 132 and the inner wheel hub portion 134 together during the manufacture of the composite vehicle wheel hub 130. Also, other means can be used to join the outer wheel hub portion 132 and the inner wheel hub portion 134 together. For example, the outer wheel hub portion 132 can include the lugs and the inner wheel hub portion 134 can include the recesses. In both instances, it can be seen that recesses 148 and the lugs 156 of the finished vehicle wheel hub are operative 130 are operative to produce a generally dovetail like joint to secure or join the inner wheel hub portion 132 and the outer wheel hub portion 134 together.

In this embodiment, the inner wheel hub portion 134 is preferably formed from a tubular blank (not shown) by a stamping process to produce an initial tubular design 160, shown in FIG. 5A. As shown in FIG. 5A, the initially formed tube 160 includes the lugs 156 and also includes a plurality of lugs 162 at an opposed end thereof. Following this, the lugs 162 are bent or folded over to extend generally perpendicular relative to the main body 154 to produce a center flange or rim 164, as shown in FIGS. 5B and 5C. It will be appreciated that the center flange 164 is not actually perfectly continuous or unbroken but will have some gaps or voids 166 in at, as in FIGS. 5B and 5C. As will be discussed below, the flange 164 is used for positioning purposes and is later removed.

Figure 6:
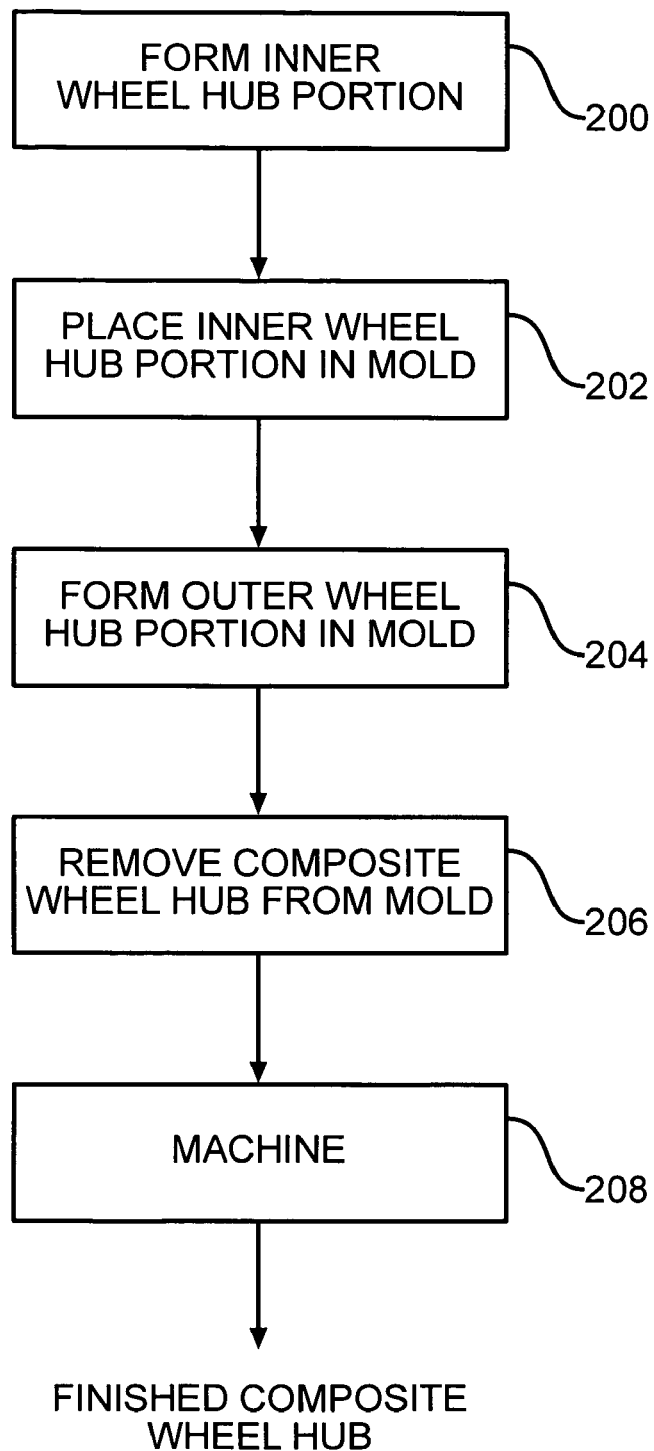
FIG. 6 is a block diagram illustrating a first sequence of steps for producing the composite vehicle wheel hub of the present invention.

Referring now to FIG. 6, there is illustrated a block diagram illustrating a first sequence of steps for producing the composite vehicle wheel hub 10, 80, 130 of the present invention. As shown therein, in step 200, the inner wheel hub portion 14, 50, 60, 84, 134 is formed by a suitable process. The inner wheel hub portion is preferably formed from metal and can be formed by any suitable metal forming process, such as for example, stamping, cutting, forging and blanking. More preferably, the inner wheel hub portion is formed from steel material having the following specifications: SAE J403 (1040) steel modified with 0.60% to 0.90% Manganese, 0.37% to 0.44% Carbon, 0.010% to 0.020% Sulfur, 0.15% to 0.35% Silicon, 0.015% maximum Phosphorus, 0.25% maximum Copper, Brinnell Hardness Number (BHN) in the range of about 187 to about 255, and a reduction ratio of approximately 6.2 to 1. Alternatively, the inner wheel hub portion can be formed from other steel materials, such as for example, 1045 steel or HSLA steel, if so desired. In the case of the inner wheel hub portions 84 and 134, step 200 also includes the step of bending or folding over the lugs 106 and 162, respectively, into the configuration illustrated in the drawings. Also, the inner wheel hub portion can be formed from a cast material, preferably cast iron, by a casting process if so desired.

Next, in step 202, the preformed/precast inner wheel hub portion 14, 50, 60, 84, 134 is positioned in a mold (not shown) in a predetermined position or location. Following this, in step 204, the associated outer wheel hub portion 12, 82 and 132 is cast in the mold. The outer wheel hub portion is preferably formed from a castable type of material. More preferably, the outer wheel hub portion is formed from cast or ductile iron.

In the illustrated embodiment, during step 204, the lugs 46, 58, 68, 106 and 156 of the inner wheel hub portion 14, 50, 60, 84 and 134, respectively, are embedded in the associated cast outer wheel hub portion 12, 82 and 132 to mechanically secure the inner wheel hub portion and the outer wheel hub portion together. Also, during step 204, depending upon the particular design of the inner and outer wheel hub portions, the materials of such portions and/or the process used to secure/join the portions together, a metallurgical bond can also created between the inner wheel hub portion 14, 50, 60, 84 and 134 and the associated outer wheel hub portion 12, 82 and 132 due to the slight fusion or melting of the inner wheel hub portion during the casting process of step 204. Alternatively, other mechanical connections, metallurgical (i.e., non-mechanical) connections and a combination of mechanical and metallurgical connections can be used to secure the inner wheel hub portion 14, 50, 60, 84 and 134 and the outer wheel hub portion 12, 82 and 132 together if so desired. Also, if the inner wheel hub portion is a precast part, the particular material of the precast inner wheel hub portion is selected so that it is not affected by the casting of the outer wheel hub portion during step 204. Thus, it can be seen that depending upon the particular design of the inner and outer wheel hub portions, the materials of such portions and/or the process/processes used to secure/join the portions together, the portions can be joined together by a mechanical connection, a metallurgical connection or a combination of both.

In step 206, the composite vehicle wheel hub 10, 80 and 130 of the present invention is removed from the mold. Next, in step 208, selected surfaces of the composite vehicle wheel hub 10, 80 and 130 are machined or otherwise finished to produce a finished composite vehicle wheel hub, indicated generally at 250 in FIG. 8. Typical finish machining operations include forming a plurality of circumferentially spaced wheel stud receiving holes 252 in a flange 266 of the composite vehicle wheel hub 250; forming a bearing seat; forming a bearing bore; and in the case of a 4×4 embodiment, forming internal splines 268. Also, in the case of the inner wheel hub portion 84 and 134, the center flange 112 and 164 is removed.

Figure 7:
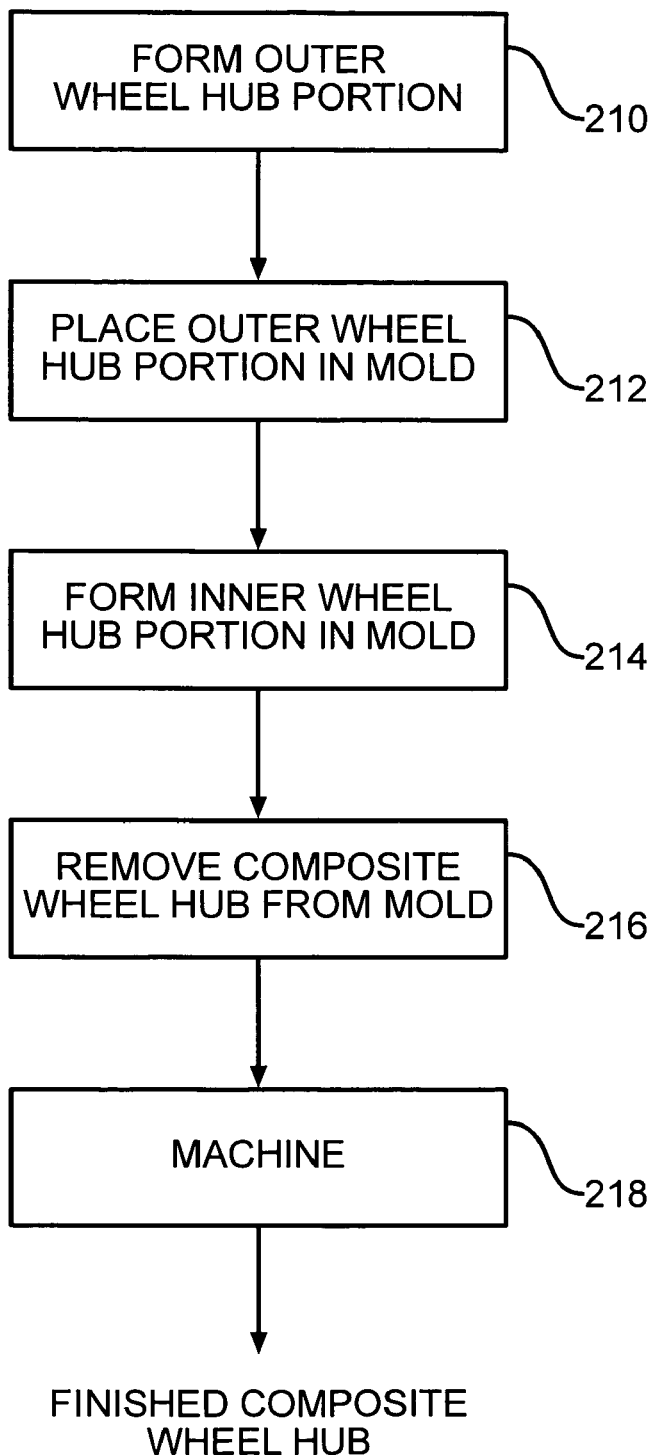
FIG. 7 is a block diagram illustrating a second sequence of steps for producing the composite vehicle wheel hub of the present invention.

Referring now to FIG. 7, there is illustrated a block diagram illustrating a second sequence of steps for producing the composite vehicle wheel hub 10, 80, 130 of the present invention. As shown therein, in step 210, the outer wheel hub portion 12, 82 and 132 is formed by a suitable process. The outer wheel hub portion is preferably formed from a castable material, such as cast iron, by a suitable casting process. More preferably, the outer wheel hub portion is formed from gray or ductile iron. Alternatively, the outer wheel hub portion can be formed from cast materials. Also, the outer wheel hub portion can be formed from a non-cast material, such as steel, by a suitable metal forming process, such as stamping, cutting, forging and blanking, if so desired.

Next, in step 212, the precast/preformed outer wheel hub portion 12, 82 and 132 is positioned in a mold (not shown) in a predetermined position or location. Following this, in step 214, the associated inner wheel hub portion 14, 50, 60, 84 and 134 is cast in the mold. The inner wheel hub portion is preferably formed from a castable type of material. More preferably, the outer wheel hub portion is formed from cast or ductile iron.

During step 214, the lugs 46, 58, 68, 106 and 156 of the inner wheel hub portion 14, 50, 60, 84 and 134, respectively, are formed in the recesses of the associated outer wheel hub portion 12, 82 and 132 to mechanically secure the inner wheel hub portion and the outer wheel hub portion together. Also, during step 214, a metallurgical bond is created between the inner wheel hub portion 14, 50, 60, 84 and 134 and the associated outer wheel hub portion 12, 82 and 132 due to the slight fusion or melting of the outer wheel hub portion during the casting process of step 214. Alternatively, other mechanical and/or non-mechanical methods can be used to secure the inner wheel hub portion 14, 50, 60, 84 and 134 and the outer wheel hub portion 12, 82 and 132 together if so desired. Also, if the outer wheel hub portion is a precast part, the particular material of the precast outer wheel hub portion is selected so that it is not affected by the casting of the inner wheel hub portion during step 214.

In step 216, the composite vehicle wheel hub 10, 80 and 130 of the present invention is removed from the mold. Next, in step 218, selected surfaces of the composite vehicle wheel hub 10, 80 and 130 are machined or otherwise finished to produce a finished composite vehicle wheel hub, indicated generally at 250 in FIG. 8. Typical finish machining operations include forming a plurality of circumferentially spaced wheel stud receiving holes 252 in a flange 266 of the composite vehicle wheel hub 250; forming a bearing seat; forming a bearing bore; and in the case of a 4×4 embodiment, forming internal splines 268. Also, in the case of the inner wheel hub portion 84 and 134, the center flange 112 and 164 is removed.

Figure 8:
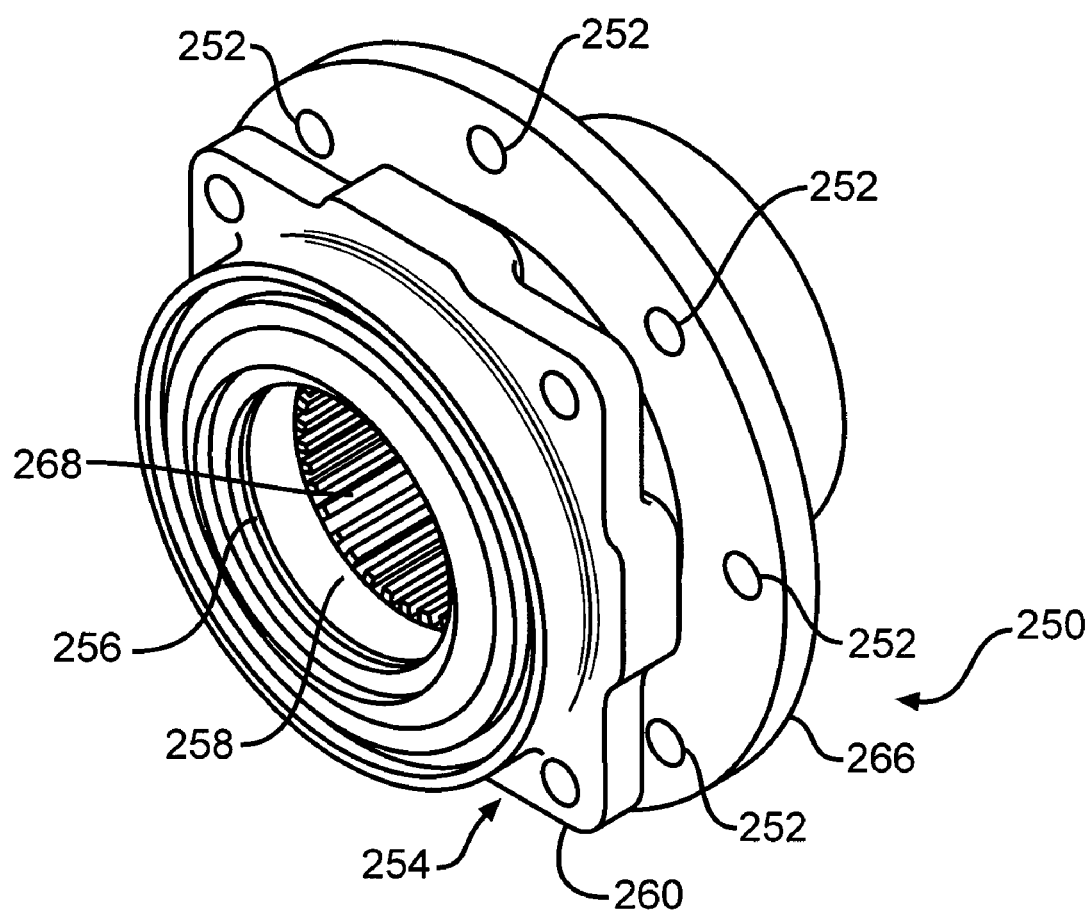
FIG. 8 is a perspective view of a vehicle wheel hub assembly constructed in accordance with the present invention having a bearing assembly installed thereon.

As shown in FIG. 8, the composite vehicle wheel hub 250 includes a bearing assembly 254 secured thereto. Briefly, the bearing assembly 254 is preferably secured and preloaded on the composite vehicle wheel hub 250 by a metal "roll forming" operation, such as that disclosed in FIGS. 9–12 of U.S. Pat. No. 6,089,673 to Wiacek et al., the disclosure of this patent incorporated by reference herein, which is operative to engage and reshape the material of the opened inboard end of the inner wheel hub portion to produce the final shape shown in FIG. 8. Alternatively, other methods can be used to secure the bearing assembly to the vehicle wheel hub. For example, the inner wheel hub portion can be provided with external threads (not shown) and a spanner nut can be used secure and load the bearing assembly without any roll forming, such as shown in prior art FIGS. 1–3 of the Wiacek et al. '673 patent or a spanner nut can be used with roll forming, such as shown in FIGS. 4–7 of the Wiacek et al. '673 patent. Alternatively, the bearing assembly 252 can be other than illustrated if so desired.

Also, as shown in FIG. 8, the wheel hub 250 is provided with a bore 256 extending therethrough from the opened inboard end to the opened outboard end. In the illustrated embodiment, the bore 256 includes internal splines 258 provided along a portion thereof. The internal splines 258 of the composite vehicle wheel hub 250 are adapted to matingly receive external splines provided on an outer surface of an associated drive member, such as for example, an axle shaft or drive shaft (not shown). Alternatively, the structure of the composite vehicle wheel hub 250 can be other than illustrated if so desired. For example, the composite vehicle wheel hub portion 250 can be of a solid design (i.e., no inner bore 256) and/or can have the bore 256 but not include the internal splines 258 (as shown in FIGS. 4C and 5C).

One advantage of the composite vehicle wheel hub 10, 80, 130 of the present invention is that it is less expensive to produce than a conventional non-composite vehicle wheel hub. Also, the composite vehicle wheel hub 10, 80, 130 of the present invention may be less massive, in terms of the total weight of the finished part, than a conventional non-composite vehicle wheel hub.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A composite vehicle wheel hub comprising:
   a non-cast inner wheel hub portion having an opened inboard end, and opened outboard end, and a generally axially extending main body, said outboard end of said inner wheel hub portion provided with a plurality of lugs spaced circumferentially therearound, said non-cast inner wheel hub portion including a first axially extending connecting portion which defines a first outer diameter; and
   a cast outer wheel hub portion joined to said inner wheel hub portion and having a generally stepped body having an opened inboard end, an opened outboard end, and a generally axially extending main body, said main body of said outer wheel hub portion provided with a radially outwardly extending flange, said cast outer wheel hub portion including a second axially extending connecting portion which defines a second outer diameter, said second axially extending connecting portion of said cast outer wheel hub portion located adjacent and joined to said first axially extending connecting portion of said non-cast inner wheel hub portion;
   wherein said lugs of said non-cast inner wheel hub portion are embedded in said cast outer wheel hub portion during the casting process to assist in securing said non-cast inner wheel hub portion and said cast outer wheel hub portion together; and
   wherein said first outer diameter of said non-cast inner wheel hub portion and said second outer diameter of said cast outer wheel hub portion are equal to one another thereby defining a constant outer diameter circumferentially along the entire axial length of said axially extending connecting portions thereof.

2. The composite vehicle wheel hub according to claim 1 wherein said inner wheel hub portion is formed from steel and said outer wheel hub portion is formed from cast iron.

3. The composite vehicle wheel hub according to claim 1 wherein said opened inboard end of said inner wheel hub portion includes a center flange.

4. The composite vehicle wheel hub according to claim 1 further including a bearing assembly supported on at least a portion of one of said outer wheel hub portion and said inner wheel hub portion.

5. The composite vehicle wheel hub according to claim 1 further including a bearing assembly supported on at least a portion of both of said outer wheel hub portion and said inner wheel hub portion.

6. The composite vehicle wheel hub according to claim 1 wherein said inner wheel hub portion and said outer wheel hub portion are non-rotationally joined together.

7. A composite vehicle wheel hub comprising:
   an inner wheel hub portion having an opened inboard end, an opened outboard end, and a generally axially extending main body, said outboard end of said inner wheel hub portion provided with a plurality of lugs spaced circumferentially therearound, said inner wheel hub portion including a first axially extending connecting portion which defines a first outer diameter; and
   an outer wheel hub portion joined to said inner wheel hub portion and having a generally stepped body having an opened inboard end, an opened outboard end, and a generally axially extending main body, said main body of said outer wheel hub portion provided with a radially outwardly extending flange, said cast outer wheel hub portion including a second axially extending connecting portion which defines a second outer diameter, said second axially extending connecting portion of said outer wheel hub portion located adjacent to and joined to said first axially extending connecting portion of said inner wheel hub portion;
   wherein said lugs of said inner wheel hub portion are adapted to be embedded in said outer wheel hub portion during a casting process to assist in securing said inner wheel hub portion and said wheel hub portion together; and
   wherein said first outer diameter of said inner wheel hub portion and said second outer diameter of said outer wheel hub portion are equal to one another thereby defining a constant outer diameter circumferentially along the entire axial length of said axially extending connecting portions thereof.

8. The composite vehicle wheel hub according to claim 7 wherein said inner wheel hub portion is formed from a non-cast material and said outer wheel hub portion is formed from a cast material.

9. The composite vehicle wheel hub according to claim 8 wherein said non-cast material is steel and said cast material is cast iron.

10. The composite vehicle wheel hub according to claim 7 wherein said inner wheel hub portion is formed from a cast material and said outer wheel hub portion is formed from a non-cast material.

11. The composite vehicle wheel hub according to claim 7 wherein said opened inboard end of said inner wheel hub portion includes a center flange.

12. The composite vehicle wheel hub according to claim 7 further including a bearing assembly supported on at least a portion of one of said outer wheel hub portion and said inner wheel hub portion.

13. The composite vehicle wheel hub according to claim 7 further including a bearing assembly supported on at least a portion of both of said outer wheel hub portion and said inner wheel hub portion.

14. The composite vehicle wheel hub according to claim 7 wherein said inner wheel hub portion and said outer wheel hub portion are non-rotationally joined together.

15. A composite vehicle wheel hub comprising:
an inner wheel hub portion having an opened inboard end, an opened outboard end, and a generally axially extending main body, said outboard end of said inner wheel hub portion provided with a plurality of lugs spaced circumferentially therearound; and
an outer wheel hub portion non-rotationally joined to said inner wheel hub portion and having a generally stepped body having an opened inboard end, an opened outboard end, and a generally axially extending main body, said main body of said outer wheel hub portion provided with a radially outwardly extending flange;
wherein said lugs of said inner wheel hub portion are adapted to be embedded in said outer wheel hub portion to thereby assist in non-rotationally securing said inner wheel hub portion and said outer wheel hub portion together,
wherein the outer diameters of said inner wheel hub portion and said outer wheel hub portion define a constant outer diameter circumferentially along the entire axial length of said axially extending main body portions thereof.

16. The composite vehicle wheel hub according to claim 15 wherein said lugs are further operative to join said inner wheel hub portion to said outer wheel hub portion to prevent axial movement relative to each other.

17. The composite vehicle wheel hub according to claim 15 wherein said inner wheel hub portion is formed from a non-cast material and said outer wheel hub portion is formed from a cast material.

18. The composite vehicle wheel hub according to claim 15 wherein said non-cast material is steel and said cast material is cast iron.

19. The composite vehicle wheel hub according to claim 15 wherein said inner wheel hub portion is formed from a cast material and said outer wheel hub portion is formed from a non-cast material.

20. The composite vehicle wheel hub according to claim 15 wherein said opened inboard end of said inner wheel hub portion includes a center flange.

21. The composite vehicle wheel hub according to claim 15 further including a bearing assembly supported on at least a portion of one of said outer wheel hub portion and said inner wheel hub portion.

22. The composite vehicle wheel hub according to claim 15 further including a bearing assembly supported on at least a portion of both of said outer wheel hub portion and said inner wheel hub portion.

* * * * *